(12) United States Patent
Weinberg

(10) Patent No.: US 11,808,653 B2
(45) Date of Patent: Nov. 7, 2023

(54) MECHANICAL BAROMETER WITH MECHANICAL CLOCKWORK FOR DETECTING ATMOSPHERIC PRESSURE

(71) Applicant: Wolfram Weinberg, Wausau, WI (US)

(72) Inventor: Wolfram Weinberg, Wausau, WI (US)

( * ) Notice: Subject to any disclaimer, the term of this patent is extended or adjusted under 35 U.S.C. 154(b) by 0 days.

(21) Appl. No.: 17/736,856

(22) Filed: May 4, 2022

(65) Prior Publication Data

US 2022/0357226 A1   Nov. 10, 2022

(51) Int. Cl.
*G01L 7/12* (2006.01)

(52) U.S. Cl.
CPC ...................... *G01L 7/12* (2013.01)

(58) Field of Classification Search
CPC ......... G01L 11/002; G01L 19/08; G01L 7/00; G01L 9/0054; G01L 19/083; G01L 11/02; G01L 19/0007; G01L 19/04; G01L 9/0008; G01L 9/0022; G01L 19/0092; G01L 19/10; G01L 7/104; G01L 7/18; G01L 7/187; G01L 9/0013; G01L 9/0016; G01L 9/0042; G01L 9/02; G01L 11/00; G01L 19/16; G01L 7/20; G01L 9/0019; G01L 9/0072; G01L 11/004; G01L 11/008; G01L 19/0084; G01L 19/0654; G01L 19/086; G01L 19/12; G01L 9/00; G01L 9/0026; G01L 9/0039; G01L 9/0048; G01L 9/0082; G01L 9/065; G01L 13/025; G01L 19/00; G01L 21/14; G01L 27/00; G01L 7/065; G01L 7/182; G01L 9/0033; G01L 9/008; G01L 9/0085; G01L 9/0091; G01L 9/12; G01L 11/006; G01L 13/00; G01L 19/003; G01L 19/0038; G01L 19/0636; G01L 19/14; G01L 19/142; G01L 19/143; G01L 19/147; G01L 19/148; G01L 21/30; G01L 27/007; G01L 27/02; G01L 7/02; G01L 7/06; G01L 7/066; G01L 7/068; G01L 7/088; G01L 7/10; G01L 7/12; G01L 7/22; G01L 9/0005; G01L 9/001; G01L 9/0036; G01L 9/0038; G01L 9/005; G01L 9/0051;
(Continued)

(56) References Cited

U.S. PATENT DOCUMENTS 7,350,414 B1 * 4/2008 Nunes ...................... G01L 7/104
73/384

FOREIGN PATENT DOCUMENTS

CN   208109330 U  * 11/2018
DE   4102923 A1  *  8/1992 ............... G01L 7/12
(Continued)

*Primary Examiner* — Andre J Allen
(74) *Attorney, Agent, or Firm* — Wagenknecht IP Law Group PC

(57) ABSTRACT

A mechanical barometer set up for detecting air pressure and direction of change and/or value of change thereof by means of a mechanical barometric measuring device, the barometer including a mechanical means which interacts with the measuring device and by means of which an acoustic code correlating with the value of the air pressure and/or the direction of change and/or the value of change thereof can be output, including a mechanical clockwork, characterized in that measuring signals provided by the measuring device can be amplified by means of the mechanical energy of a clockwork, wherein the mechanical means can be activated at regular time intervals by means of the clockwork.

10 Claims, 1 Drawing Sheet

(58) Field of Classification Search
CPC ..... G01L 9/0052; G01L 9/0055; G01L 9/007;
G01L 9/0083; G01L 9/0088; G01L
9/0097; G01L 9/0098; G01L 9/06; G01L
9/085; G01L 9/16; G01L 19/0015; G01L
19/0645; G01L 23/24; G01L 7/082
USPC .......................................................... 73/384
See application file for complete search history.

(56) References Cited

FOREIGN PATENT DOCUMENTS

| DE | 102021111553 B3 * | 8/2022 | ............... G01L 7/12 |
| DE | 202021102395 U1 * | 9/2022 | |
| JP | 7101854 B1 * | 7/2022 | |
| WO | WO-2005114125 A2 * | 12/2005 | ........... G01L 19/083 |
| WO | WO-2012050409 A1 * | 4/2012 | ........... G01L 9/0082 |

* cited by examiner

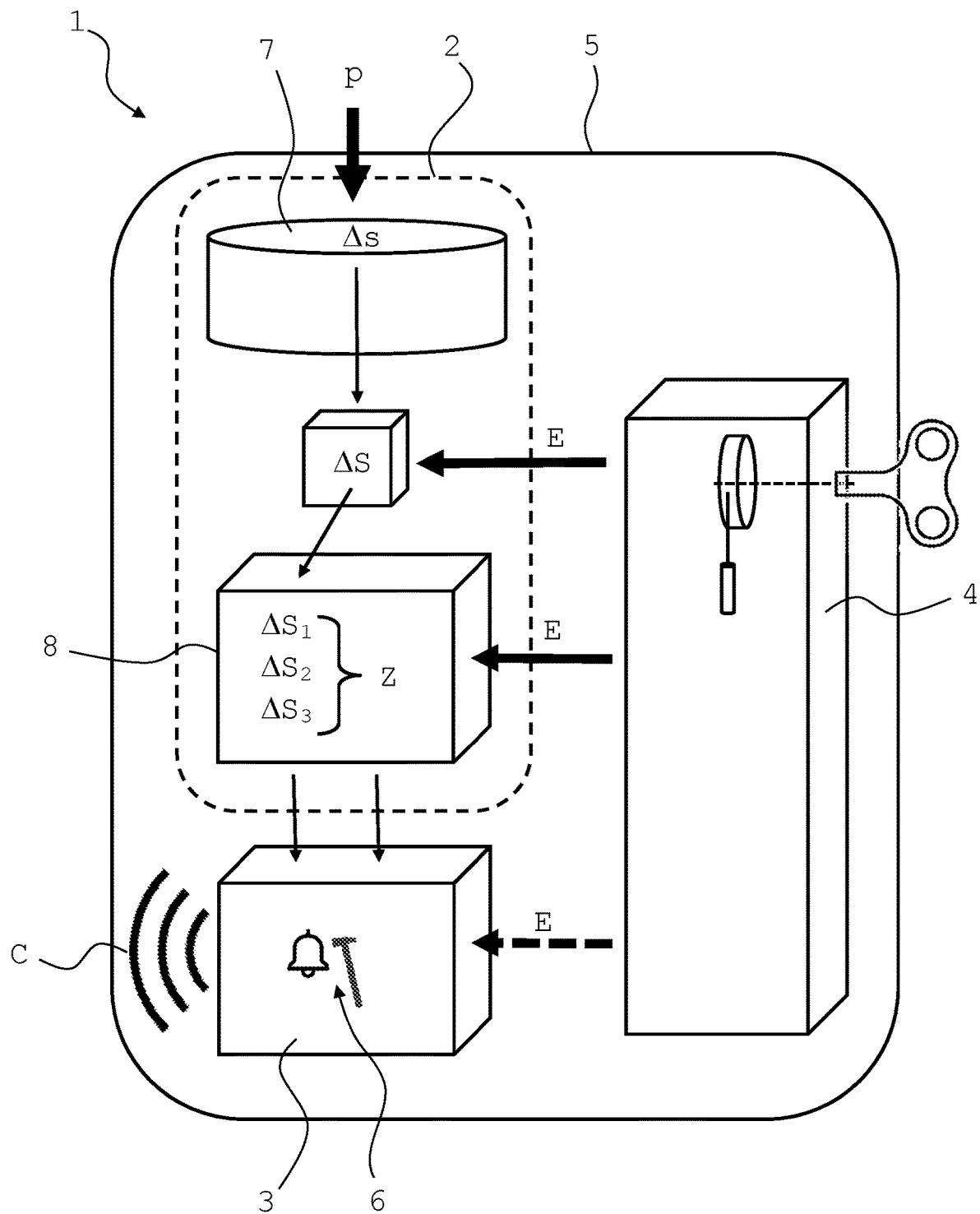

MECHANICAL BAROMETER WITH MECHANICAL CLOCKWORK FOR DETECTING ATMOSPHERIC PRESSURE

CROSS REFERENCE TO RELATED APPLICATIONS

This application claims priority to German patent application no. 10 2021 111 553.1, filed May 4, 2021; the entire content of which is herein incorporated by reference.

TECHNICAL FIELD

The invention relates to the field of barometric measuring instruments for domestic use. In particular, the invention relates to a mechanical barometer with an extended indication, as well as to a method for indicating atmospheric pressure values.

BACKGROUND OF THE INVENTION

Barometers are well known from the state of the art. They are used to measure atmospheric pressure, and are used, especially in the home, to predict the weather. Mechanical barometers typically comprise an airtight can, which deforms slightly as atmospheric pressure changes. Higher atmospheric pressure compresses the can accordingly more. The degree of deformation thus correlates (within certain limits even proportionally) with the atmospheric pressure. It can be removed at a suitable location, such as the center of the face of the can. Typically, it is amplified by means of suitable mechanisms and fed to a barometer hand, which moves along in front of a scale.

It is well known that a atmospheric pressure exceeding the global relative (sea level) mean of about 1013 hPa by up to about 35 hPa indicates sunny, dry weather, while a atmospheric pressure up to about 45 hPa below this value indicates humid, cloudy weather.

However, not only the actual value is of great interest, but also its trend. Rising atmospheric pressure generally indicates that the weather is improving, and falling atmospheric pressure indicates that it is deteriorating. Although this statement must always be seen in connection with the current weather situation, season, etc., the basic rules are quite simple to understand, which is why barometers are very popular in home use for weather forecasting.

Various methods are known to capture the tendency. A written note of the daily values, for example, can be made without aids in order to be able to read off the trend on the basis of the measurement series. For simplicity, barometers often include detectable tendency hands. These are first brought into alignment with the barometer hand. At the next reading, it can thus be recognized whether the barometer hand has moved to a higher or a lower value.

The disadvantage of these solutions is that manual action by the user is always necessary (noting, turning the hand); if this is forgotten, the current trend may no longer be reliably determinable. In addition, the atmospheric pressure can also change quite rapidly, which entails a correspondingly frequent action on the part of the user in order to reliably detect these trend changes as well. In reality, few users are willing or able to take action sufficiently frequently. Accordingly, the usefulness of such a barometer with manual trend indication is limited.

To solve this problem, mechanical barometers with tendency indication are known from the state of the art. The document DE 1948764 A1 discloses a mechanical barometer with automatic tendency indication. A friction-locked connection of an actuator, which follows the movements of the measuring unit, can be used to actuate an element indicating the respective tendency, such as a toggle contact. Thus, the user is relieved of the need to regularly interact with the barometer and can read the current trend of atmospheric pressure at any time.

However, the disadvantage of this solution is still that the barometer must still be looked at in order to know the tendency of the atmospheric pressure. This involves to have to approach the barometer that is not always possible or desirable.

SUMMARY OF THE INVENTION

A barometer according to the invention is intended to allow a user to become aware of the atmospheric pressure and/or the tendency thereof without having to physically go to the barometer for the purpose of reading the dial.

In one aspect of the invention, a mechanical barometer set up for detecting air pressure (p) and direction of change and/or value of change thereof by means of a mechanical barometric measuring device is provided. The barometer including a mechanical means which interacts with the measuring device and by means of which an acoustic code correlating with the value of the air pressure and/or the direction of change and/or the value of change thereof can be output, including a mechanical clockwork, characterized in that measuring signals provided by the measuring device can be amplified by means of the mechanical energy of a clockwork, wherein the mechanical means can be activated at regular time intervals by means of the clockwork.

In some embodiments, the code is composed of individual acoustic signals in the form of tones. In some embodiments, in order to generate the acoustic code, the pitch of a single tone, the pitch of the sequence of several tones, the tone length, and/or tone sequence speed can be influenced by the value of the air pressure (p) and/or its direction of change.

In some embodiments, the value of air pressure is correlatable with tone sequence velocity of a plurality of tones, and/or wherein the value of change direction is correlatable with the height of the successive tones.

In some embodiments steady visual indication of the value of the air pressure and/or the value and the direction of its change.

In some embodiments, the same is integrated in the housing of a striking clock, by means of the clockwork, the measuring signals are reinforcable, and by means of the sound generator of which the tones coding the value of the air pressure and/or its direction of change and/or its value of change are producible.

In another aspect of the invention, a method of displaying the value of air pressure and the direction of change and/or the value of change thereof is provided, which includes the following steps: detection of the air pressure as well as the direction of change and/or the value of change thereof by means of a mechanical barometric measuring device; correlating the value of the air pressure and/or the direction of change and/or the value of change thereof with an acoustic code using a mechanical means cooperating with the measuring device; generating the acoustic code using acoustic signals; so that the value of the air pressure and/or its direction of change and/or the value of change can be registered by a user even at a certain distance without optical perception of a display, wherein measuring signals provided by the measuring device are amplified by means of the mechanical energy of a clockwork which also supplies the mechanical means for outputting the acoustic code with mechanical energy.

In some embodiments, the output of the acoustic code occurs at regular time intervals.

In some embodiments, the value of the air pressure and/or its direction of change and/or its value of change influences the pitch of a single tone, the pitch of the sequence of several tones, the tone length, and/or tone sequence velocity.

In some embodiments the method is carried out using the mechanical barometer as described herein.

BRIEF DESCRIPTION OF THE DRAWINGS

FIG. 1 depicts an exemplary barometer.

DETAILED DESCRIPTION

In the following, the device according to the invention is first described. This is followed by a description of the process according to the invention.

The invention relates to a mechanical barometer which can be used for atmospheric pressure and its direction of change ("tendency") and/or value of change are recorded by means of a mechanical barometric measuring device.

Preferably, an evacuated metal of known design is used as the measuring device for the atmospheric pressure. The tendency can be determined in various ways, for example, as suggested in the above-mentioned print.

It should be emphasized that the barometer uses only mechanical energy both to measure the atmospheric pressure and to detect the tendency of the same. The detection of atmospheric pressure typically does not require any energy to be supplied at all (the deformation of the can occurs precisely due to the change in atmospheric pressure). In contrast, the "tendency indicator" (device for detecting the direction of change) requires a certain amount of energy, which in the present solution is mechanical in nature. It can be provided, for example, by a tensioned spring or a descending weight.

The barometer is characterized in that it comprises a mechanical means cooperating with the measuring device, by means of which an acoustic code correlating with the value of the atmospheric pressure and/or its direction and/or value of change can be indicated.

This means that the barometer is capable of generating an acoustic signal corresponding to the respective numerical value (or at least a range of values, e.g. "low", "normal" and "high" or "falling", "constant" and "rising"), which—knowing the underlying code—allows a conclusion to be drawn about the level of atmospheric pressure and/or its tendency.

The conversion of the numerical value into the acoustic signal is also purely mechanical in the present invention. The energy required for this can come from different sources, preferably it comes from the same source as the one mentioned above, which feeds the tendency indication with energy.

Particularly preferably, the signal allows the inference of both the value of the atmospheric pressure and its tendency.

According to the invention, the barometer comprises a clockwork by means of which the mechanical means can be activated at regular time intervals.

The term "clock movement" therefore initially refers only to a mechanical device to which a sufficient amount of mechanical energy can be supplied and in which it can be stored, and which can release this energy over a suitably long period (e.g. days or weeks) in order to make it available in a correspondingly finely dosed manner to a component that consumes mechanical energy. In this respect, the movement can also serve the operation of the above change direction detection device.

In the present case, however, the term also means that this energy is provided at specific, predefined intervals. Accordingly, the means supplied with mechanical energy by the movement is not activated continuously, but only at regular intervals, so that the coded acoustic signal also sounds only at these intervals. This has the advantage that a user is regularly informed about the atmospheric pressure and its tendency completely without his own intervention. In this way, announcing important weather events such as thunderstorms, which are accompanied by a rapid change in atmospheric pressure, are not "overlooked".

The term "movement", on the other hand, does not mean that it is a part of a device used to measure time. According to another embodiment, the activation occurs alter natively or additionally upon detection of a change in atmospheric pressure and/or its tendency. This means that, if necessary, no acoustic signal will sound as long as the atmospheric pressure and tendency are essentially constant, for example, when the atmospheric pressure is constantly high, or when the tendency is constantly rising or falling. Only when the atmospheric pressure changes, or the trend slows down, accelerates or reverses, the acoustic signal is emitted. The advantage of this embodiment is that the signal sounds less frequently, since it is not absolutely necessary to repeatedly "confirm" the currently prevailing atmospheric pressure and its trend.

It is also possible that time intervals of the activation are adjustable, or can be switched off for a certain period (e.g. at night).

According to the invention, the measuring signals provided by the measuring device can be amplified by means of the clockwork. This means that the measuring movements of the barometric measuring device, which typically involve only very short distances, small angles or small forces, are mechanically reinforced. These increased distances, angles or forces can then be absorbed and implemented more safely and robustly by the above-mentioned mechanical means.

The invention thus avoids the disadvantages known from the prior art.

The barometer according to the invention allows a user to know the atmospheric pressure and/or the tendency and/or its value thereof without having to physically go to the barometer for reading a dial. On the contrary, it is possible to perceive the acoustic "indication" even without visual contact, for example when the barometer is not in the same room, is covered, or in darkness. Accordingly, a barometer of the type according to the invention offers a significant advantage over known barometers. This advantage can also be particularly important if the person using the device has limited vision and/or mobility. Only one source of mechanical energy is required which powers the reinforcement of the mechanical barometric measuring device as well as the mechanical means by means of which the acoustic code in generated.

Various embodiments of the invention are described in more detail below.

According to one embodiment, the above-mentioned "code" is composed of individual acoustic signals in the form of tones such as, in particular, chime strokes. Accordingly, the barometer comprises one or more sound generators as a sub-unit of the mechanical means, which may be sound bodies, pipes, chimes or the like. Depending on the type of sound generator, this then includes, for example, a striking mechanism or a blowing device. Sound generators can also be sound reeds working together with drums, which can play melodies composed of individual tones.

Also, the combination of several, also different, sound generators is possible. Thus, a first sound generator can be a whistle, and another sound generator can be a chime. The sound generators can be controlled simultaneously or sequentially. In particular, sequential control is advantageous for the present purpose of coding.

Acoustic coding is possible by different methods that can be combined with each other. In each case, the code-determining parameter described below can be influenced by the value of the atmospheric pressure and/or its direction of change.

According to one embodiment, the acoustic code uses the pitch of a single tone. This means that it is possible to draw conclusions from the pitch to the corresponding numerical value/value range to be indicated or to the tendency. Typically, a lower pitch represents a lower value/value range, or a falling tendency, and a higher pitch represents a higher value/value range, or a rising tendency.

According to one embodiment, the acoustic code uses the pitch of the sequence of multiple, e.g., two or three, tones. This is particularly advantageous for encoding the tendency; a rising tone sequence means rising tendency and vice versa.

According to another embodiment, the acoustic code uses the tone length. A short tone (e.g. 0.5 s) can then be equated with high or rising values, and a longer tone (e.g. 1 s) with medium or stagnant values, and an even longer tone (e.g. 2 s) for low or falling values.

According to still another embodiment, the acoustic code uses the tone sequence velocity. This means that tones following each other quickly (pause e.g. 1 s) encode high values or rising tendency, tones following each other with a lower frequency (e.g. 2 s) encode medium values or a stagnant tendency, and tones following each other with a particularly slow frequency (e.g. 4 s) encode low values or a falling tendency.

It is clear that a combination of the described coding types can also be possible and advantageous. For example, a code can use both the tone sequence speed for the level of atmospheric pressure (e.g. range of values high/medium/low), and indicate the tendency by the pitch (high for rising, medium for unchanged, low for falling). Rapidly successive tones of medium pitch then represent high atmospheric pressure of constant tendency.

According to another embodiment, the value of the atmospheric pressure is correlatable with the height and/or length of a first tone, and/or the value of the direction of change is correlatable with the height of two successive tones.

According to a preferred embodiment, the mechanical barometer includes a display for providing a steady visual indication (visual display) of the value of barometric pressure and/or its direction or value of change. "Continuous" here means "uninterrupted". These can for example be presented with a hand over a dial or in form of symbols, or also, for example, figures which are shown in the manner of well-known "weather houses" depending on their appearance for good or bad weather (high/rising or low/falling atmospheric pressure) or which advance to a certain position.

The above-mentioned movement can also be advantageously used to operate the optical display.

According to a preferred embodiment, the mechanical barometer is integrated into the housing of a chiming clock.

A chiming clock is a clock that is set up to periodically generate acoustic signals, typically in the form of chimes, whistles, or the like. This can be a wall clock, grandfather clock, but also a wristwatch or even a tower clock.

Advantageously, by means of the clock movement present in the chiming clock, the measuring signals can be amplified, as described further above.

This means that the energy provided by the movement is used for more robust operation of the mechanical barometer. In particular, an extension of the distance, an increase of the angle, and/or an increase of the forces provided by the measuring device take place with regard to the measuring signal.

In addition, by means of the sound generator(s) present in the impact clock, it is advantageously possible to generate the above-described sounds encoding the value of the atmospheric pressure and/or its direction of change and/or its value of change. In other words, the barometer interacts with the components of the chiming clock in such a way that it is also able to use the already existing possibility of generating acoustic signals by the chiming clock. In this way, a beneficial symbiosis is created from the components of both instruments.

According to a particularly preferred embodiment, the chiming clock is a (mechanical) cuckoo clock. Accordingly, the sound generators used are the whistles and/or bells or chimes present in the cuckoo clock. The movement of the cuckoo clock, which is typically equipped with springs or weights as energy storage devices, also supplies energy to the components of the barometer that require such energy. Due to the often already existing different types of several sound generators (whistles and chimes) a coding of the atmospheric pressure value and its tendency is particularly well possible. Moreover, the cuckoo clock (as well as other striking clocks) intrinsically comprises the possibility of activating the mechanical means at regular time intervals; these may advantageously coincide with the time intervals provided for indicating the time (e.g., quarterly, half-hourly or hourly).

The method according to the invention is described below. This is used to display the value of the atmospheric pressure as well as the direction and/or value of change of the same, and is characterized by the following steps:
  (a) Detection of the atmospheric pressure as well as the direction and/or value of change of the same by means of a mechanical barometric measuring device.
  (b) Correlating the value of atmospheric pressure and/or the direction and/or value of change thereof with an acoustic code using a mechanical means cooperating with the measuring device.
  (c) Output of the acoustic code using acoustic signals.

In this way, the value of the atmospheric pressure and/or its direction and/or value of change can be registered by a user even at a certain distance without visual perception of a display. In other words, the user notices the (approximate, possibly relative) value of the atmospheric pressure and especially preferably also its tendency on the basis of the acoustic signals even if he is at a distance from the measuring device which does not permit visual inspection of the same, or if the lighting conditions or also his physical condition make this difficult or even prevent it. Further, measuring signals provided by the measuring device are amplified by means of the mechanical energy of a clockwork which also supplies the mechanical means for outputting the acoustic code with mechanical energy.

Consequently, the method of acoustic coding of atmospheric pressure value and tendency according to the invention offers an advantage over the known methods for operating mechanical barometers.

Preferably, the acoustic code is output at regular intervals, such as every quarter, half, or full hour. Thus, the user can get knowledge of the value and tendency of the atmospheric pressure even without active intervention. This is particularly advantageous when, for example, a strong and rapidly falling atmospheric pressure predicts a thunderstorm, which indicates a certain, imminent danger, of which the user would not become aware without the acoustic "alert" or would only notice late.

Otherwise, reference is made to the embodiments of the barometer according to the invention described further above and the explanations thereto.

Preferably, the value of the atmospheric pressure and/or its direction and/or value of change affects the pitch of a single tone, the pitch of the sequence of multiple tones, the tone length, and/or velocity of tone sequence. Similarly, reference is made to the above statements in order to avoid repetition.

Particularly preferably, the method according to the invention is carried out using a mechanical barometer as described above, to which reference is made. Accordingly, such a barometer provides in a particularly advantageous manner all the components required for carrying out the method according to the invention.

Preferred Embodiment

A particularly preferred embodiment of the invention is explained below by way of example with reference to a figure.

In the single FIG. 1, an embodiment of the mechanical barometer 1 according to the invention is schematically shown.

Its housing 5, indicated by the solid line, includes a barometric measuring device 2 with a pressure can 7. This deforms as a function of the atmospheric pressure p. This results in a measurement signal $\Delta s$ in the form of a (small) extension.

The (small) measuring signal $\Delta s$ is now reinforced by means of a movement 4 supplying mechanical energy E (amplified measuring signal $\Delta S$).

The tendency, i.e. the direction of change Z of the atmospheric pressure p, is now determined from the reinforced measurement signal $\Delta S$ by means of a suitable mechanical auxiliary device 8. This auxiliary device 8 is also still assigned to the barometric measuring device 2 (dashed line). The movement 4 also supplies mechanical energy E to the auxiliary device 8.

Finally, the value of the atmospheric pressure p and its tendency Z are transmitted to a mechanical means 3 with sound generator 6. This means 3 is also supplied with mechanical energy E by the movement. However, the broken line indicates that the activation of agent 3 is only intermittent and not continuous. Thus, an acoustic signal is generated only at predetermined time intervals, which then allows conclusions to be drawn about the atmospheric pressure p and its tendency Z, taking into account the code C, without having to view the barometer.

LIST OF REFERENCE SIGNS

1 Barometer
2 barometric measuring device
3 mechanical means
4 Movement
5 Housing
6 Sound generator
7 Pressure can
8 Auxiliary device
p Atmospheric pressure
C Code
E mechanical energy
$\Delta s$, $\Delta S$ Measuring signal
W Value of change
Z Direction of change, tendency

What is claimed is:

1. A mechanical barometer (1), set up for detecting the pressure (p) and the direction of change and/or value of change (W) thereof by means of a mechanical barometric measuring device (2), the barometer (1) comprising a mechanical means (3) which interacts with the measuring device (2) and by means of which an acoustic code (C) correlating with the value of the atmospheric pressure (p) and/or the direction of change (Z) and/or the value of change thereof (W) is output, comprising a mechanical clockwork, characterized in that measuring signals ($\Delta s$) provided by the measuring device (2) are amplified by means of the mechanical energy of a clockwork (4), wherein the mechanical means (3) is configured to be activated at regular time intervals by means of the clockwork (4).

2. The mechanical barometer (1) according to claim 1, wherein the code (C) is composed of individual acoustic signals in the form of tones.

3. The mechanical barometer (1) according to claim 2, wherein, in order to generate the acoustic code (C), the pitch of a single tone, the pitch of the sequence of several tones, the tone length, and/or tone sequence speed is influenced by the value of the atmospheric pressure (p) and/or its direction of change (Z).

4. The mechanical barometer (1) according to claim 1, wherein the value of atmospheric pressure (p) is correlatable with tone sequence velocity of a plurality of tones, and/or wherein the value of change direction (Z) is correlatable with the height of the successive tones.

5. The mechanical barometer (1) according to claim 1, comprising a steady visual indication of the value of the atmospheric pressure (p) and/or the value (W) and the direction (Z) of its change.

6. The mechanical barometer (1) according to claim 1, wherein the same is integrated in the housing of a striking clock, by means of the clockwork, the measuring signals ($\Delta S$) are reinforceable, and by means of the sound generator (6) of which the tones coding the value of the atmospheric pressure (p) and/or its direction of change (Z) and/or its value of change (W) are producible.

7. A method of displaying the value of atmospheric pressure (p) and the direction of change (Z) and/or the value of change (W) thereof, characterized by the following steps:
   detecting the atmospheric pressure (p) as well as the direction of change (Z) and/or the value of change (W) thereof by means of a mechanical barometric measuring device (2);
   correlating the value of the atmospheric pressure (p) and/or the direction of change (Z)and/or the value of change (W) thereof with an acoustic code (C) using a mechanical means (3) cooperating with the measuring device (2);
   generating the acoustic code (C) using acoustic signals;
   so that the value of the atmospheric pressure (p) and/or its direction of change (Z) and/or the value of change (W) is registered by a user even at a certain distance without optical perception of a display, wherein measuring signals ($\Delta s$) provided by the measuring device (2) are amplified by means of the mechanical energy of a clockwork (4) which also supplies the mechanical means (3) for outputting the acoustic code (C) with mechanical energy.

8. The method according to claim 7, wherein the output of the acoustic code (C) occurs at regular time intervals.

9. The method according to claim 8, wherein the value of the atmospheric pressure (p) and/or its direction of change (Z) and/or its value of change (W) influences the pitch of a single tone, the pitch of the sequence of several tones, the tone length, and/or tone sequence velocity.

10. The method according to claim 7, wherein said method is carried out using the mechanical barometer (1).

\* \* \* \* \*